(12) United States Patent
Kawachiya

(10) Patent No.: US 10,481,882 B2
(45) Date of Patent: Nov. 19, 2019

(54) REDUCING WASTE AREAS INSIDE STRINGS

(71) Applicant: INTERNATIONAL BUSINESS MACHINES CORPORATION, Armonk, NY (US)

(72) Inventor: Kiyokuni Kawachiya, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 110 days.

(21) Appl. No.: 15/288,499

(22) Filed: Oct. 7, 2016

(65) Prior Publication Data
US 2018/0101365 A1  Apr. 12, 2018

(51) Int. Cl.
G06F 9/44 (2018.01)
G06F 8/41 (2018.01)
G06F 12/02 (2006.01)

(52) U.S. Cl.
CPC ............ G06F 8/4434 (2013.01); G06F 12/02 (2013.01)

(58) Field of Classification Search
CPC ...................................................... G06F 8/315
See application file for complete search history.

(56) References Cited

U.S. PATENT DOCUMENTS

| 8,510,710 B2 | 8/2013 | Harren et al. | |
| 8,732,183 B2 | 5/2014 | Soel et al. | |
| 2008/0178189 A1* | 7/2008 | Findeisen | G06F 9/5016 718/104 |
| 2010/0235412 A1* | 9/2010 | Kawachiya | G06F 17/2205 707/813 |
| 2011/0320780 A1* | 12/2011 | Dyck | G06F 9/30032 712/220 |
| 2014/0189655 A1* | 7/2014 | Amaral | G06F 11/3612 717/127 |
| 2016/0139895 A1* | 5/2016 | Stella | G06F 8/44 717/147 |

OTHER PUBLICATIONS

Kawachiya, J. e tal., "Analysis and Reduction of Memory Inefficiencies in Java Strings". ACM SIGPLAN International Conference on Object-Oriented Programming, Systems, Languages, and Applications held Oct. 19-23, 2008, Nashville TN, USA. pp. 285-401.
GeeksforGeeks, A computer science portal for geeks, "Check whether two strings are anagram of each other". http://www.geeksforgeeks.org/check-whether-two-strings-are-anagram-of-each-other/. Accessed/viewed Jul. 15, 2016. pp. 1-20.

* cited by examiner

*Primary Examiner* — Hang Pan
(74) *Attorney, Agent, or Firm* — Tutunjian & Bitetto, P.C.; Vazken Alexanian

(57) ABSTRACT

A computer-implemented method is presented for removing overlap character array of a programming language where a part of the character array is used as a value of a string. The computer-implemented method includes, when comparison of a first string and a second string succeeds, modifying the string using a larger character array to use a smaller character array. The computer implemented method further includes collecting the larger character array in a subsequent GC process. When the offset of the string's value in the character array needs to be used, it is atomically accessed with the value field by using the two-word compare and swap instruction or by allocating the value and offset field in the same word.

16 Claims, 7 Drawing Sheets

```
public final class String implements ...{
    private char[ ] value;   //reference to char array that contains the string value
    private int offset;      // start offset of the string value in the char array
    private int count;       //length of the string value
    private int hashCode;    //hash code of this string, or 0
}
```

REDUCING WASTE AREAS INSIDE STRINGS

BACKGROUND

Technical Field

The present invention relates generally to computing systems, and more specifically, to systems and methods for reducing waste areas inside strings.

Description of the Related Art

Computers, which are information processing apparatuses, conventionally operate in accordance with a program written in a programming language such as C or Java. The computer stores data such as numeric values and strings used in arithmetic in a memory which is a storage.

For example, in a computer operating in accordance with a Java program written in Java, which is an object-oriented language, garbage collection (hereinafter referred to as GC) that automatically frees a memory area in a memory that stores data that is no longer in use, without intervention of a programmer is used. In one GC implementation, a memory is divided into two memory areas, a first memory area storing a first type of data group having a relatively short lifetime and a second memory area storing a second type of data group having a relatively long lifetime, and GC is executed more frequently on the first memory area than on the second memory area. In this way, GC is limited to a particular memory area in consideration of the characteristics of data, thereby efficiently freeing the memory area.

SUMMARY

In accordance with one embodiment, a computer-implemented method for removing overlap character array of a programming language where a part of the character array is used as a value of a string is provided. The computer-implemented method includes, when comparison of a first string and a second string succeeds, modifying the string using a larger character array to use a smaller character array. The computer-implemented method further includes collecting the larger character array in a subsequent GC process.

In accordance with another embodiment, a system for removing overlap character array of a programming language where a part of the character array is used as a value of a string is provided. The system includes a memory and a processor in communication with the memory, wherein the computer system is configured to, when comparison of a first string and a second string succeeds, modify the string using a larger character array to use a smaller character array, and collect the larger character array in a subsequent GC process.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium can be any apparatus that contains means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

In one or more embodiments, a computer-implemented method executed on a processor is presented for removing overlap character array of a programming language where a part of the character array is used as a value of a string. The computer-implemented method includes, when comparison of a first string and a second string succeeds, modifying the string using a larger character array to use a smaller character array, and collecting the larger character array in a subsequent GC process.

In one or more embodiments, when a string comparison (String.equals) succeeds, the larger char array is replaced with the smaller char array by modifying the "value" and "offset" fields. The larger char array (which contains unnecessary area) is no longer referenced from the string object, and so it can be collected in the next garbage collection (GC). The same string object can be accessed by other threads in parallel, so the "value" and "offset" fields must be accessed atomically to keep them consistent.

In one or more embodiments, one way to accomplish such atomic access is to use 2-word compare_and_swap instructions. If a reference is represented by 32-bit data in 64-bit Java VM (this is the case where compressed references function is used), aligning "value" and "offset" in one 64-bit word makes it possible to access them atomically by normal read/write operations. These fields are declared as private, so user programs cannot access them directly. The "count" field need not be modified since the replacing operation is performed only when the strings' values are the same (e.g., "count" fields are same).

Figure 1:
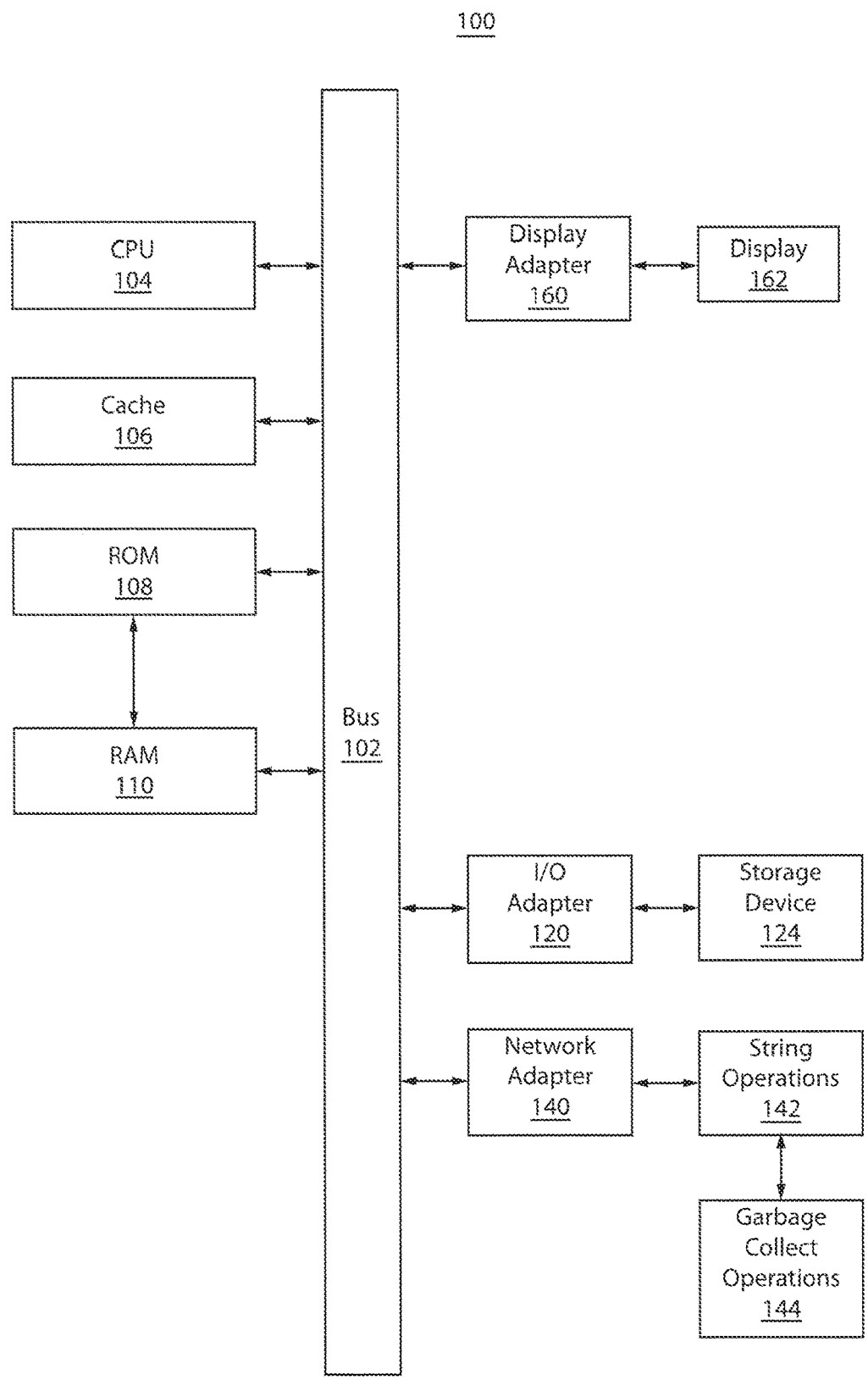
FIG. 1 is a block/flow diagram of an exemplary computing system for removing overlap character array of a programming language where a part of the character array is used as a value of a string, in accordance with an embodiment of the present invention.

Referring now to the drawings in which like numerals represent the same or similar elements and initially to FIG. 1, a block/flow diagram of an exemplary computing system for removing overlap character array of a programming language where a part of the character array is used as a value of a string is presented, in accordance with an embodiment of the present invention.

An exemplary string processing system 100 to which the present invention can be applied is shown in accordance with one embodiment. The string processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 140, and a display adapter 160, are operatively coupled to the system bus 102.

The I/O adapter 120 further communicates with a storage device 124.

The network adapter 140 further communicates with devices for enabling string operations 142 and garbage collection operations 144.

A display device 162 is operatively coupled to system bus 102 by display adapter 160.

Of course, the string processing system 100 can also include other elements (not shown), as readily contemplated by one of skill in the art, as well as omit certain elements. For example, various other input devices and/or output devices can be included in the string processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the string processing system 100 are readily contemplated by one of ordinary skill in the art given the teachings of the present invention provided herein.

Note that, hereinafter, the description will be given an example of a case where the embodiment of the invention is implemented in Java. In Java, the operation of a character string is executed through a String (java.lang.String) object. Accordingly, a character string in scope of claims refers to the String object itself or a character string included in the String object in Java.

Figures 2, 3:
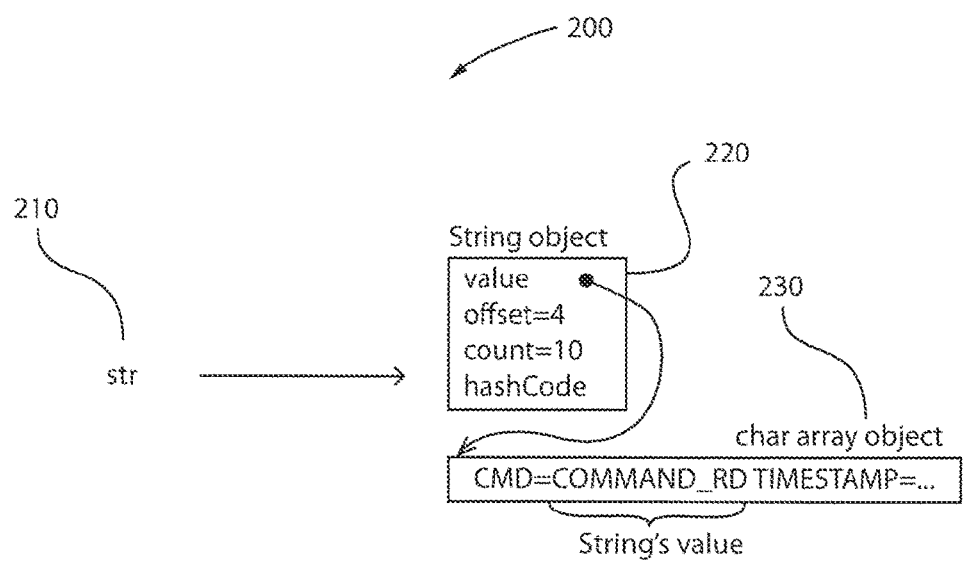
FIG. 2 is a block/flow diagram of an exemplary java string represented as two objects, in accordance with an embodiment of the present invention.
FIG. 3 is a block/flow diagram of an exemplary code for a java string, in accordance with an embodiment of the present invention.

FIG. 2 is a block/flow diagram of an exemplary java string represented as two objects, in accordance with an embodiment of the present invention.

The diagram 200 depicts a string 210 represented as two objects. The first object is a String object 220 and the second object is a char array object 230. A String object stores "value" internally which points to the char array and have "offset" of the first character and characters' "count." The "value" is used for character storage. The "offset" is the first index of the storage that is used. The "count" is the number of characters in the string. When one creates a new string, its "offset" is set to "0" and length to that of the character array. However, when one creates a subset of a string, the underlying character array can be shared and the returned string has its offset and length changed. In the instant case, the value of the offset is 4 and the value of the count is 10. Thus, the string value exists in the char array referenced by "value" at the range starting from "offset" and length of "count."

A computer operating in accordance with a Java program executes garbage collection (GC) to free memory areas to reduce the amount of data stored in a memory used by the computer.

In a typical implementation of an execution environment of a Java program, strings represented by string objects are referred to in char array objects. The char array object generally has two characteristics.

A first characteristic is that a char array object can contain char data that is not referenced as a string of a string object. If such a char array object is not referred to by objects other than a string object, it is desirable that the memory area in which the char data that is not referenced as a string of the string object be freed to save the memory space consumed by the computer.

A second characteristic is that there can be multiple char array objects that have the same string data. In Java, characters of string objects cannot be modified. In the above case, it is desirable that two identical char array objects be consolidated into one and the memory area that stores one of the objects be freed to reduce the memory space consumed by the computer.

FIG. 3 is a block/flow diagram of an exemplary code for a java string, in accordance with an embodiment of the present invention.

The code 300 illustrates the values of the character array, offset, and length of the string object 220 of FIG. 2.

In an embodiment of the present invention, a "program including processing of a character string" is a program that executes some kind of processing for a character string during execution of the program. In addition, the aforementioned processing includes processing for a variable, structure or object in which the character string is stored, for example. The aforementioned processing is, for example, processing to generate a character string, processing to duplicate a character string, processing to search for any character included in a character string, processing to convert any character included in a character string into a different character, processing to extract any character from a character string, processing to concatenate character strings, processing to compare character strings or processing to acquire information on a character string, but the processing is not limited to the aforementioned processing types.

In an embodiment of the present invention, "operation for a character string" is some kind of operation for a character string to be executed in a program or for an area where the character string is stored. The operation for a character string to be executed in the aforementioned program refers to, for example, generation of a character string, duplication of a character string, search for any character included in a character string, conversion of a character included in a character string into another character, extraction of any character from a character string, concatenation of character strings, comparison of character strings or acquisition of information on a character string. However, the operation is not limited to these examples. An example of the processing for the area where a character string to be executed in a program is stored is to secure a memory area to which the character string is assigned, for example, but the processing is not limited to this.

Like most object-oriented applications, a Java application typically allocates new objects to a region of a system memory within a data-processing system commonly referred to as a "heap." During execution, the Java application relies on a garbage collection process to reclaim space within the heap that is no longer utilized by previously allocated objects. The garbage collection process is typically invoked whenever the Java application attempts to create a new object but there is insufficient free space available within the heap to satisfy such object allocation.

In Java virtual machine, a "synchronous" garbage collection process is typically employed for performing the task of heap space reclamation. Generally, the synchronous garbage collection process begins its operations by temporarily stopping all Java application(s) within the Java virtual machine. Next, the synchronous garbage collection process traverses a Java stack and the heap in order to search for all active objects and their "children." These active objects and their "children" are then marked accordingly. Afterwards, the heap is searched again for a second time to reclaim (or free) any space previously utilized by unmarked (or dead) objects.

Figure 4:
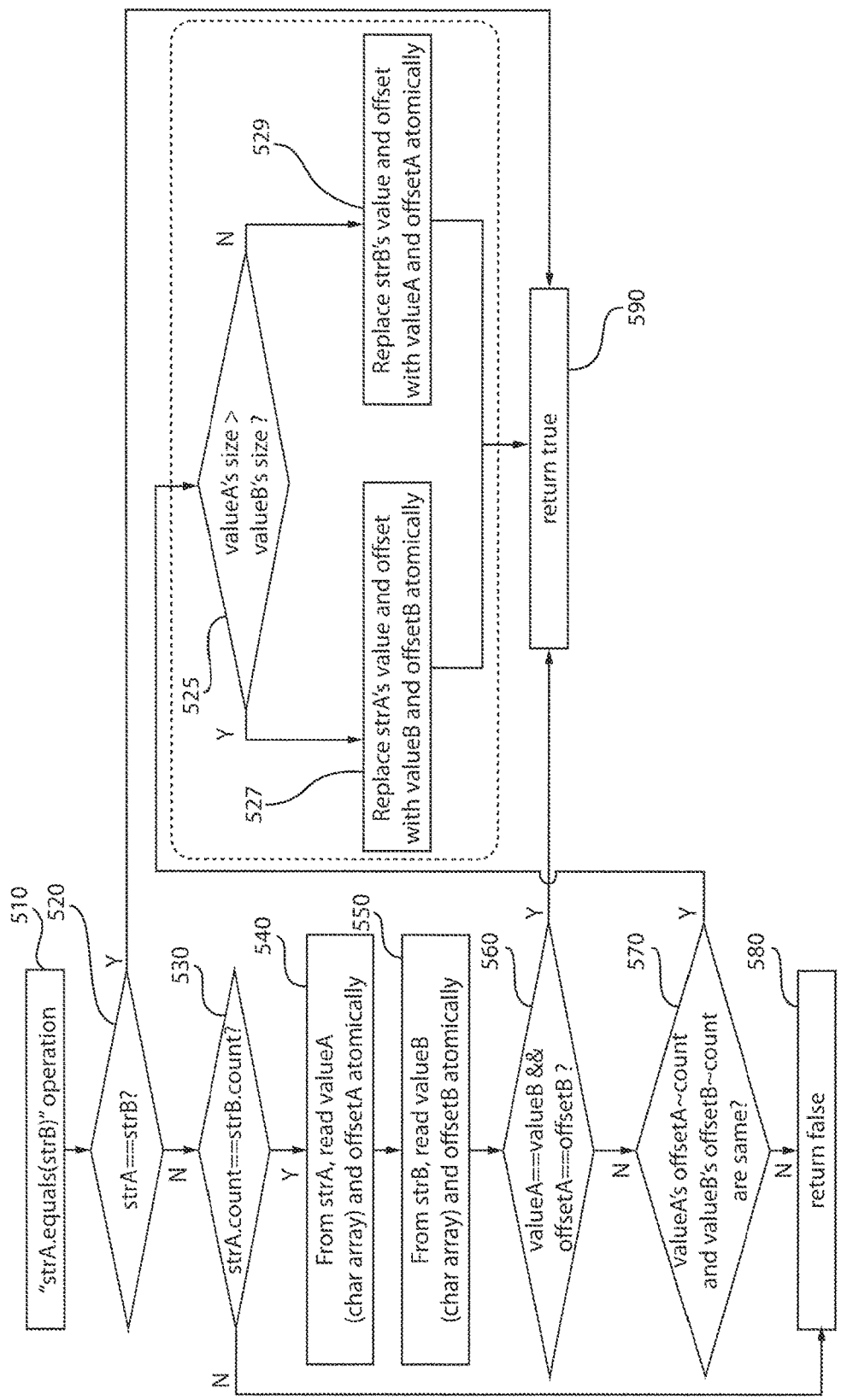
FIG. 4 is a block/flow diagram of an exemplary method for performing string comparison, in accordance with an embodiment of the present invention.

FIG. 4 is a block/flow diagram of an exemplary method for performing string comparison, in accordance with an embodiment of the present invention.

At block 510, a string comparison operation commences, where string A is compared to string B.

At block 520, it is determined whether string object A is identical to string object B. If YES, the process proceeds to block 590, where TRUE is returned. If NO, the process proceeds to block 530.

At block 530, it is determined whether the "count" of string A is equal to the "count" of string B. If NO, the proceed proceeds to block 580 where FALSE is returned. If YES, the process proceeds to block 540.

At block 540, the value and offset of string A is read atomically.

At block 550, the value and offset of string B is read atomically.

At block 560, it is determined if the value of string A is equal to the value of string B and if the offset of string A is equal to the offset of string B. If YES, the process proceeds to block 590 where TRUE is returned. If NO, the process proceeds to block 570.

At block 570, it is determined whether the string characters of string A is equal to the string characters of string B. If NO, the process proceeds to block 580 where FALSE is returned. If YES, the process proceeds to block 525.

At block 525, it is determined whether a size of string A's character array (pointed to through the value field) is larger than string B's character array. In other words, it is determined whether the first string or the second string has a larger character array.

If string A's character array is larger than string B's character array, then the process proceeds to block 527 where string A's value and offset fields are replaced with string B's value and offset fields atomically.

If string A's character array is smaller than string B's character array, then the process proceeds to block 529 where string B's value and offset fields are replaced with string A's value and offset fields is atomically.

Therefore, the string using a larger character array is modified to use a smaller character array.

Figure 5:
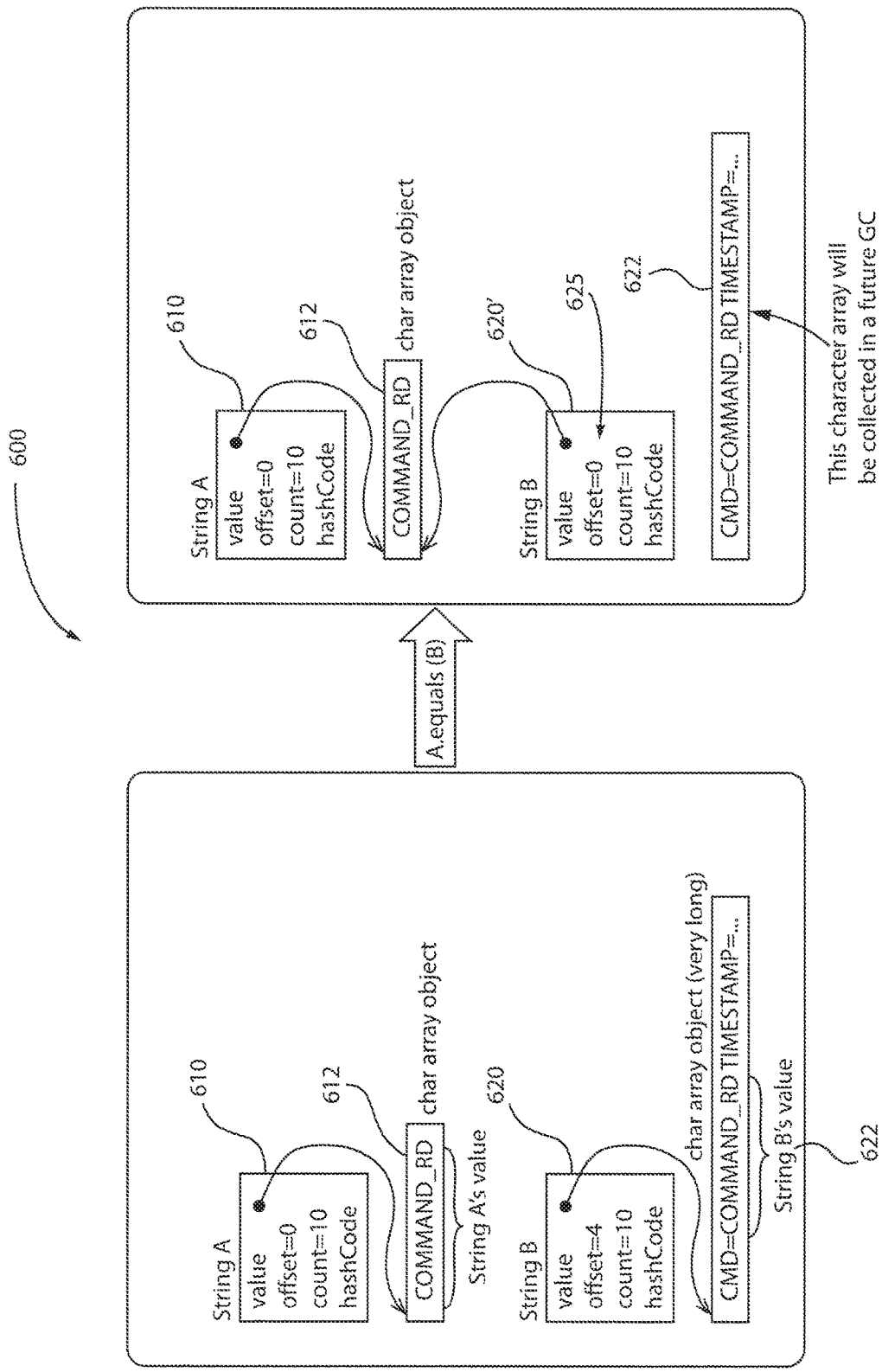
FIG. 5 is a block/flow diagram of an exemplary string comparison and atomic replacement of value and offset fields when the comparison succeeds, in accordance with an embodiment of the present invention.

FIG. 5 is a block/flow diagram of an exemplary string comparison and atomic replacement of value and offset fields when the comparison succeeds, in accordance with an embodiment of the present invention.

The string comparison 600 depicts two strings to be compared, that is, string A and string B. String A has a string object 610 and a char array object 612. String B has a string object 620 and a char array object 622. String A has an offset value of "0" and a count value of "10." String B has an offset value of "4" and a count value of "10." A comparison of strings A and B reveals that string B's character array is larger than string A's character array. Since the string comparison succeeded, the larger char array (of string B) is replaced with the smaller char array (of string A). Therefore, the modified string object 620' includes an offset value of "0" instead of "4." As a result, the larger character array 622 (which contains unnecessary area) is collected in a future GC.

Figure 6:
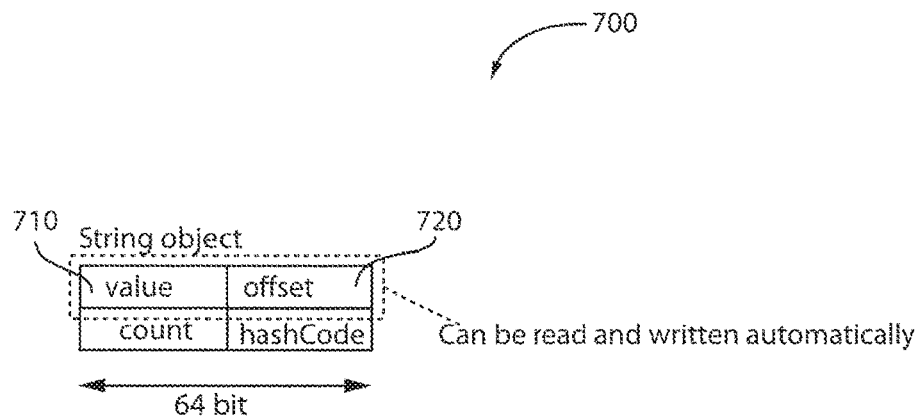
FIG. 6 is a block/flow diagram of an exemplary string structure in 64-bit machine where the value and offset fields are allocated in the same word, in accordance with an embodiment of the present invention.

Moreover, the same string object can be accessed by other threads in parallel, so that the "value" and "offset" fields must be accessed atomically to keep them consistent. One way to accomplish such atomic access is to use 2-word compare and swap instructions. If a reference is represented by 32-bit data in 64-bit Java VM (this is the case where compressed references function is used), aligning "value" and "offset" in one 64-bit word makes it possible to access them atomically by normal read/write operations (FIG. 6). These fields are declared as private, so user programs cannot access them directly. The "count" field need not be modified since the replacing operation is performed only when the strings' values are the same (e.g., "count" fields are same).

Regarding the Java compiler, when a user programs for the Java platform, the user writes source code in .java files and then compiles them. The compiler checks the code against the language's syntax rules, then writes out bytecode in .class files. Bytecode is a set of instructions targeted to run on a Java virtual machine (JVM). In adding this level of abstraction, the Java compiler differs from other language compilers, which write out instructions suitable for the CPU chipset the program will run on.

Regarding JVM, at runtime, the JVM reads and interprets .class files and executes the program's instructions on the native hardware platform for which the JVM was written. The JVM interprets the bytecode just as a CPU would interpret assembly-language instructions. The difference is that the JVM is a piece of software written specifically for a particular platform. The JVM is the heart of the Java language's "write-once, run-anywhere" principle. The user's code can run on any chipset for which a suitable JVM implementation is available. JVMs are available for major platforms like Linux and Windows, and subsets of the Java language have been implemented in JVMs for mobile phones.

Regarding the garbage collector (GC), rather than forcing a user to keep up with memory allocation (or use a third-party library to do so), the Java platform provides memory management out of the box. When the user's Java application creates an object instance at runtime, the JVM automatically allocates memory space for that object from the heap, which is a pool of memory set aside for the program to use. The Java GC runs in the background, keeping track of which objects the application no longer needs and reclaiming memory from them. This approach to memory handling is called implicit memory management because it doesn't require the user to write any memory-handling code.

An atomic action is one that effectively happens all at once. An atomic action cannot stop in the middle. It either happens completely or it doesn't happen at all. No side effects of an atomic action are visible until the action is complete. In the instant case, for example, at least "offsets" are atomic.

FIG. 6 is a block/flow diagram of an exemplary string structure in 64-bit machine where the value and offset fields are allocated in the same word, in accordance with an embodiment of the present invention.

If value (pointer) and offset (integer) are both 32-bit, they can be allocated in the same 64-bit word, as shown in FIG. 6. A string object 700 consists of two 64-bit words, where the value 710 and the offset 720 are located in the same 64-bit word. With this layout, both the value 710 and the offset 720 can be read and written atomically using normal operations.

Figure 7:
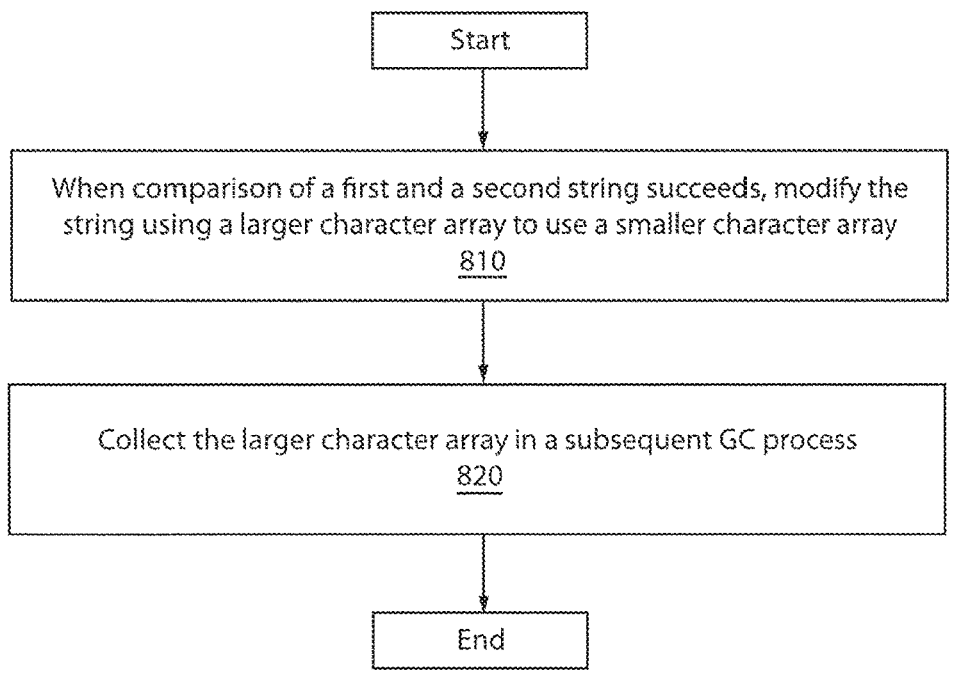
FIG. 7 is a block/flow diagram of an exemplary method for modifying a string which uses a larger character array to use a smaller character array, in accordance with an embodiment of the present invention.

FIG. 7 is a block/flow diagram of an exemplary method for modifying a string which uses a larger character array to use a smaller character array, in accordance with an embodiment of the present invention.

At block 810, when comparison of a first string and a second string succeeds, modify the string using a larger character array to use a smaller character array.

At block 820, collect the larger character array in a subsequent GC process.

Figure 8:
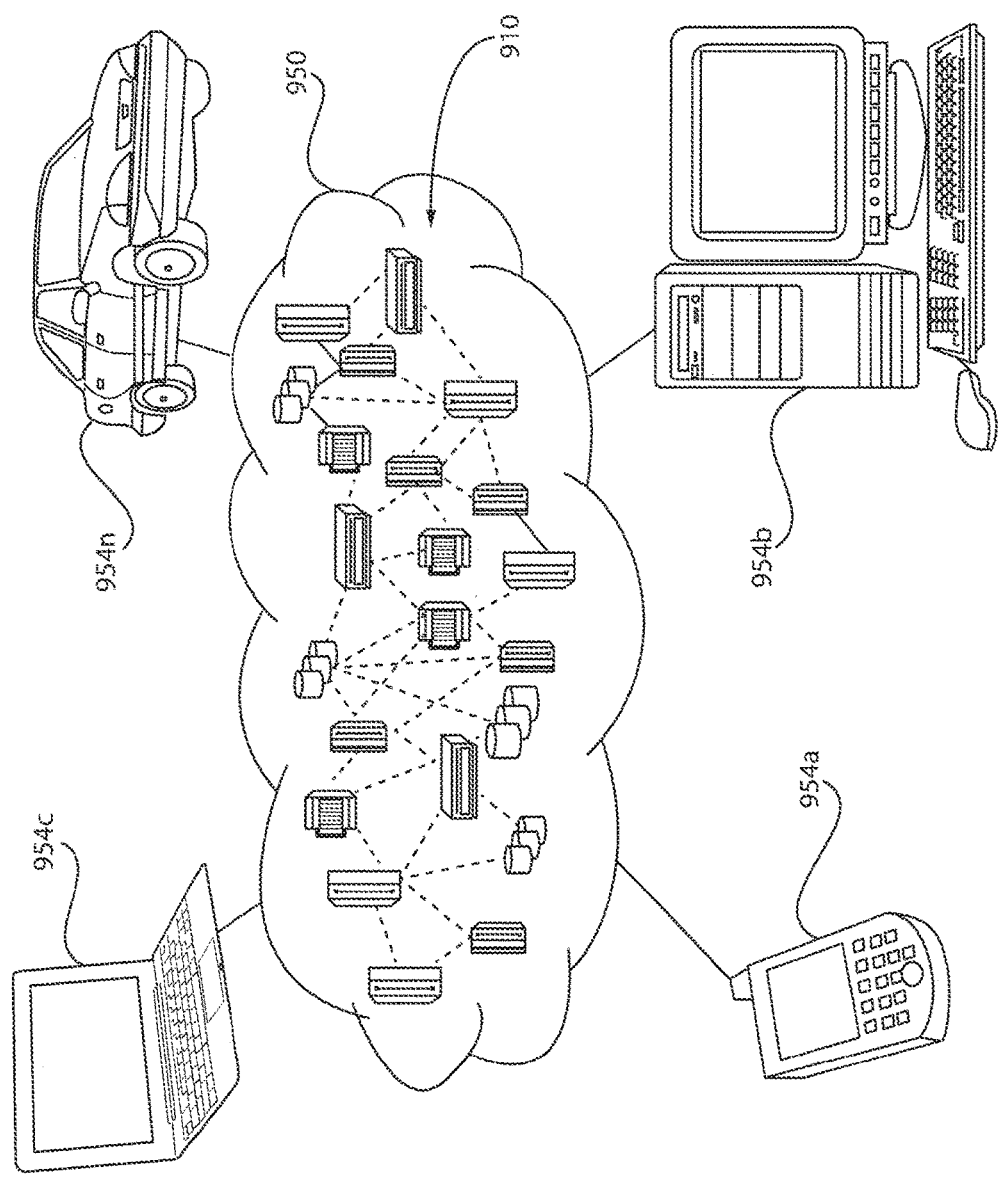
FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 950 is depicted for removing overlap character array of a programming language where a part of the character array is used as a value of a string. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N can communicate. Nodes 910 can communicate with one another. They can be grouped (not shown) physically or virtually, in one or more networks, such as Private, Community, Public, or Hybrid clouds as described hereinabove, or a combination thereof. The network can also be a network for removing overlap character array of a programming language where a part of the character array is used as a value of a string. This allows cloud computing environment 950 to offer infrastructure, platforms and/or software as services for which a cloud consumer does not need to maintain resources on a local computing device. It is understood that the types of computing devices 954A-N shown in FIG. 8 are intended to be illustrative only and that computing nodes 910 and cloud computing environment 950 can communicate with any type of computerized device over any type of network and/or network addressable connection (e.g., using a web browser).

Figure 9:
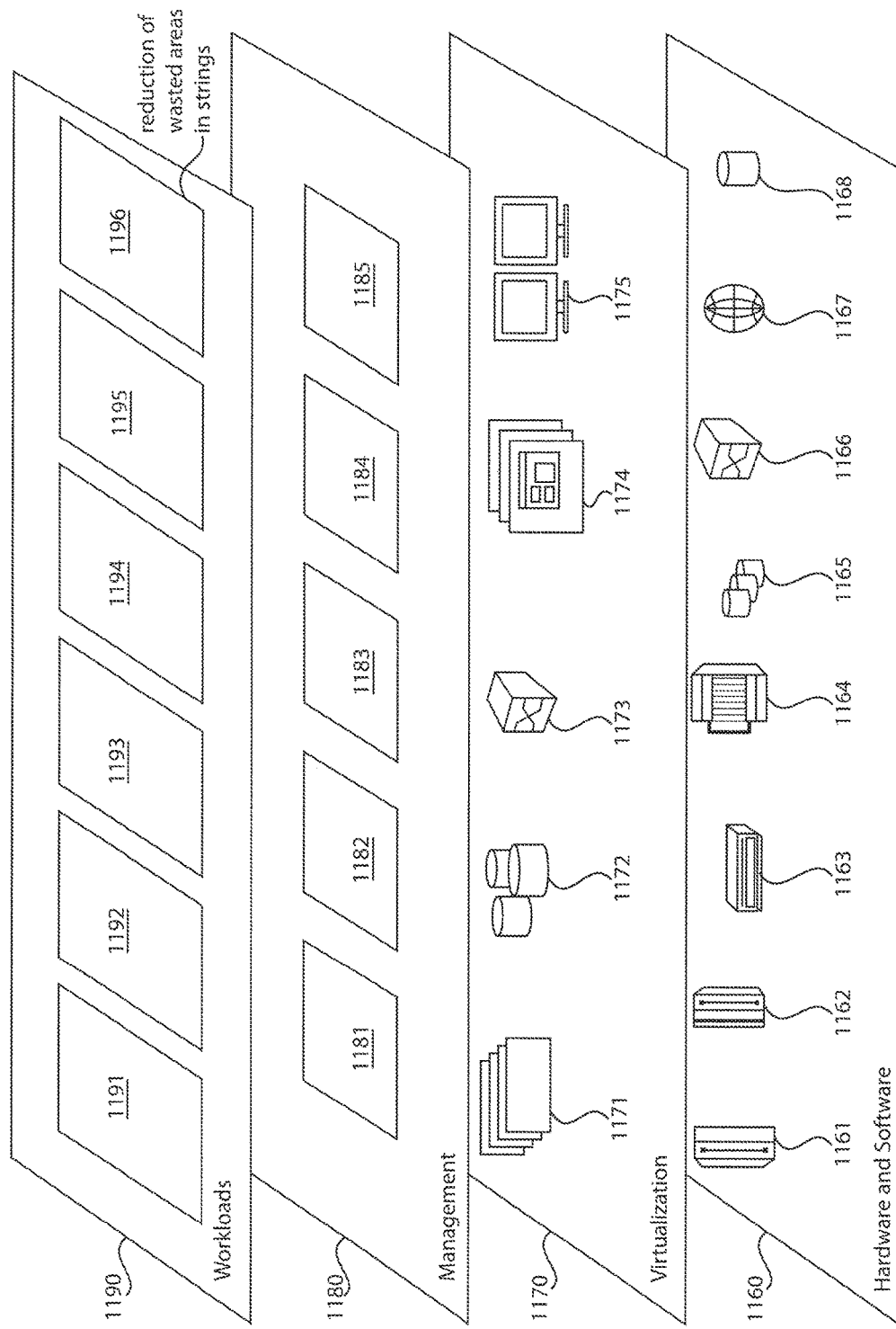
FIG. 9 is a schematic diagram of exemplary abstraction model layers, in accordance with an embodiment of the present invention.

FIG. 9 is a schematic diagram of exemplary abstraction model layers, in accordance with an embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities can be provided: virtual servers 1171; virtual storage 1172; virtual networks 1173, including virtual private networks; virtual applications and operating systems 1174; and virtual clients 1175.

In one example, management layer 1180 can provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment can be utilized. Examples of workloads and functions which can be provided from this layer include: mapping and navigation 1191; software development and lifecycle management 1192; virtual classroom education delivery 1193; data analytics processing 1194; transaction processing 1195; and reduction of wasted areas in strings 1196.

Still yet, any of the components of the present invention could be created, integrated, hosted, maintained, deployed, managed, serviced, etc. by a service supplier who offers to provide a method for removing overlap character array of a programming language where a part of the character array is used as a value of a string. Thus, the present invention describes a process for deploying, creating, integrating, hosting, maintaining, and/or integrating computing infrastructure, including integrating computer-readable code into the string processing computer system 100 (FIG. 1), wherein the code in combination with the string processing computer system 100 is capable of performing at least a method for removing overlap character array of a programming language where a part of the character array is used as a value of a string. In another embodiment, the invention provides a business method that performs the process blocks/steps of the invention on a subscription, advertising, and/or fee basis. That is, a service supplier, such as a Solution Integrator, could offer to provide a method for removing overlap character array of a programming language where a part of the character array is used as a value of a string. In this case, the service supplier can create, maintain, support, etc. a computer infrastructure that performs the process blocks/steps of the invention for one or more customers. In return, the service supplier can receive payment from the customer (s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the embodiments of the invention, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system, method, and computer program for removing overlap character array of a programming language where a part of the character array is used as a value of a string (which are intended to be illustrative and not limiting), it is noted that modifications and variations can be made by persons skilled in the art in light of the above teachings. It is therefore to be understood that changes can be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for removing overlap character array of a programming language where a part of the character array is used as a value of a target string, the method comprising:
   comparing a character array size of a first string with a character array size of a second string;
   if the character array sizes are different, modifying the target string by replacing a larger character array with a smaller character array;
   collecting the larger character array in a subsequent string garbage collection (GC) process; and
   permitting a string object of the target string to be accessed by other threads in parallel such that value and offset fields are atomically accessed and declared private in the string GC process where the larger character array is collected, so that user programs are prevented from accessing the value and offset fields directly.

2. The method of claim 1, wherein modification of the target string involves replacing an offset value of the target string.

3. The method of claim 2, wherein the value and offset fields reference the character array in a same word of a string object.

4. The method of claim 3, wherein the value and the offset fields are atomically accessed by normal read/write operations.

5. The method of claim 4, wherein the atomic access is enabled by two-word compare and swap instructions.

6. The method of claim 1, wherein a count field of the first and second strings is not modified by the replacing of the larger character array with the smaller character array.

7. A computer system for removing overlap character array of a programming language where a part of the character array is used as a value of a target string, the computer system comprising:
   a memory; and
   a processor in communication with the memory, wherein the computer system is configured to:
      compare a character array size of a first string with a character array size of a second string;
      if the character array sizes are different, modify the target string by replacing a larger character array with a smaller character array;
      collect the larger character array in a subsequent string garbage collection (GC) process; and
      permit a string object of the target string to be accessed by other threads in parallel such that value and offset fields are atomically accessed and declared private in the string GC process where the larger character array is collected, so that user programs are prevented from accessing the value and offset fields directly.

8. The computer system of claim 7, wherein modification of the target string involves replacing an offset value of the target string.

9. The computer system of claim 8, wherein the value and offset fields reference the character array in a same word of a string object.

10. The computer system of claim 9, wherein the value and the offset fields are atomically accessed by normal read/write operations.

11. The computer system of claim 10, wherein the atomic access is enabled by two-word compare and swap instructions.

12. The computer system of claim 7, wherein a count field of the first and second strings is not modified by the replacing of the larger character array with the smaller character array.

13. A non-transitory computer readable storage medium comprising a computer readable program for removing overlap character array of a programming language where a part of the character array is used as a value of a target string, wherein the computer readable program when executed on a computer causes the computer to perform the steps of:
   comparing a character array size of a first string with a character array size of a second string;
   if the character array sizes are different, modifying the target string by replacing a larger character array with a smaller character array;
   collecting the larger character array in a subsequent string garbage collection (GC) process; and
   permitting a string object of the target string to be accessed by other threads in parallel such that value and offset fields are atomically accessed and declared private in the string GC process where the larger character array is collected, so that user programs are prevented from accessing the value and offset fields directly.

14. The non-transitory computer readable storage medium of claim 13, wherein the first string having a first value field and the second string having a second value field, the larger value field defining a larger character array and the smaller value field defining a smaller character array.

15. The non-transitory computer readable storage medium of claim 13, wherein the method allocates value and offset fields that reference the character array in a same word of a string object.

16. The non-transitory computer readable storage medium of claim 13, wherein a count field of the first and second strings is not modified by the replacing of the larger character array with the smaller character array.

* * * * *